OPTICAL SYSTEM FOR RELATING COLOR COMPONENT IMAGES

Filed April 7, 1953

3 Sheets-Sheet 1

Inventors
LeRoy M. Dearing
Donald H. Kelly
by Roberts, Cushman & Grover
Att'ys.

OPTICAL SYSTEM FOR RELATING COLOR COMPONENT IMAGES
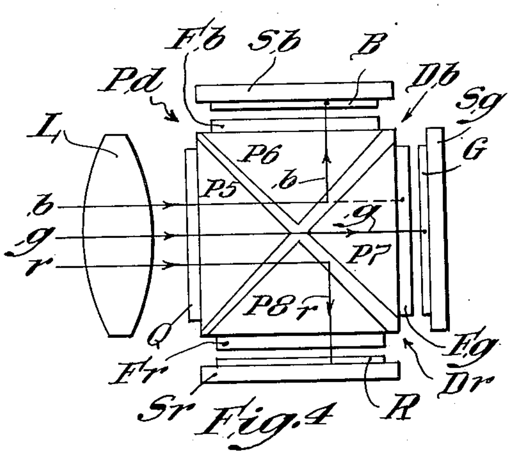
Fig. 4
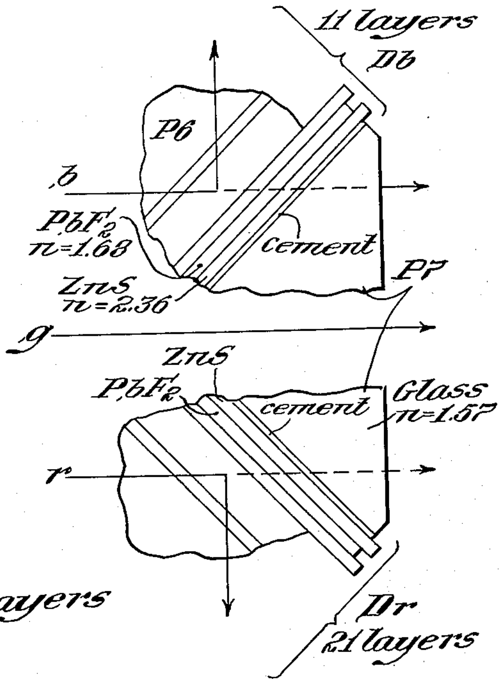
Fig. 6
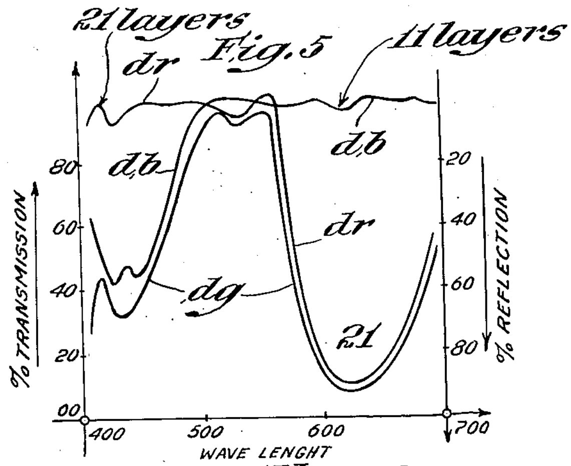
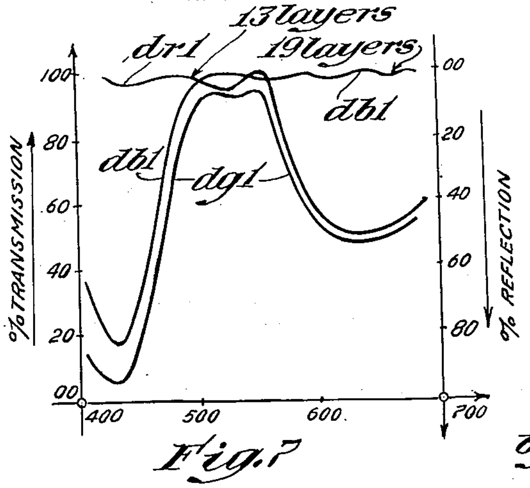
Fig. 7
Inventors
LeRoy M. Dearing
Donald H. Kelly
by Roberts, Cushman & Grover
att'ys.

OPTICAL SYSTEM FOR RELATING COLOR COMPONENT IMAGES

Filed April 7, 1953 3 Sheets-Sheet 3

Inventors
LeRoy M. Dearing
Donald H. Kelly
by Roberts, Cushman & Grover
Att'ys.

United States Patent Office 2,809,570

Patented Oct. 15, 1957

2,809,570

OPTICAL SYSTEM FOR RELATING COLOR COMPONENT IMAGES

Le Roy M. Dearing and Donald H. Kelly, Los Angeles, Calif., assignors to Technicolor Corporation, Hollywood, Calif., a corporation of Maine Application April 7, 1953, Serial No. 347,278

4 Claims. (Cl. 95—12.2)

Various branches of the optical art, particularly color photography and color television, involve several coexisting but spatially distinct images of the same object field, each image representing a given spectral range. The separation or combination of such images should be accomplished with a minimum loss of light in its range in order to secure the maximum effect relative to the material from or onto which the image is projected, such as photographically sensitive emulsions, transparencies for additive projection, photoelectrically sensitive screens of television cameras, or electron responsive screens of television viewing apparatus.

Various arrangements for accomplishing the above indicated purposes have been suggested, and prominent among these are systems employing so-called light dividing surfaces or transparent reflectors which separate an incident light beam into a transmitted and a reflected beam or combine two component beams.

Such systems may have one or more light dividing surfaces. A single surface provides two beams for two-color systems, but it can also be utilized for work with three or more color aspects if two or more, superimposed or interlaced, image receiving or sending working surfaces are introduced in one or both component light beams. Two or more dividing surfaces are required for systems with more than two component beams.

In arrangements employing two superimposed image effecting or affected working surfaces, the light which reaches the rear surface is inherently affected by the front surface. This is in some aspects a disadvantage which is however often outweighed by the fact that two-beam arrangements avoid structural complications or provide shorter overall optical paths than certain three beam arrangements.

However due to the above-mentioned limitations inherent in superimposed surfaces, the speed of the rear surface is reduced by the light absorption of the components in front thereof which, in the instance of photographic emulsions as working surfaces usually comprise color filters in addition to the front emulsion and its support. In order to minimize this effect, the front emulsion is often made unusually thin which although admitting more light, introduces other difficulties. The extent to which the energy contents of a component beam can be utilized at the working, image affected or effecting surface depends upon the various optically effective elements that might be contained in the path of the component beam between and including the dividing surface and the working surface or surfaces. This effectivity of the energy contents of a given component beam, for short referred to as beam effectivity, is therefore in many instances appreciably different from the effectivity and sensitivity proper of the working surface, such as affected by the photographic emulsion characteristics or the photoelectric response of the screen of a cathode ray tube. It will be noted that the terms "beam" and "aperture" do not necessarily denote equivalent concepts; for example, in Fig. 1 three films constituting working surfaces are contained in two apertures and three beams, two of which happen to be coaxial, are effective with regard to three respective films.

Although the problem of unequal beam effectivity is especially acute in two beam-three surface devices, the same problem arises where three component beams are used in conjunction with three separate image surfaces. This is due to the fact that after being separated and placed in independent apertures the three working surfaces are still not likely to be matched concerning their response to the respective color aspect images. In the case of photographic recording, the sensitive layer thicknesses, absolute speeds, and grain are interrelated so that the increase of sensitivity to given spectral ranges which can be obtained without introducing excessive graininess and other undesirable properties is limited. For example a given amount of granularity in the green or red recording negatives produces a much more disturbing effect in the final print than the same granularity in the blue record, due to the lower contrast sensitivity of the eye to the yellow subtractive dye in which the final blue aspect record is printed. Thus the blue record can be grainy and hence faster than the other two. In the case of the red and green records, the emulsion speeds are also limited by the properties of the sensitizing dyes used. At the present state of the art of emulsion manufacture, the blue recording emulsion is likely to be the most sensitive in a three aperture camera with the red negative speed next and the green negative speed lowest of all three, although red recording emulsions are sometimes used which are more sensitive than the others.

Another factor which affects the energy effectivity of a given beam is the filter effect of the dielectric material used in the layers of the color selective interference coatings such as employed in accordance with the present invention, and that of conventional absorption filters supplementing the interference coatings.

Since the ultimate usefulness of apparatus of this type depends upon light energies which are never abundantly available, its overall efficiency, namely the ratio of ultimately utilized to initially available light energy is of the utmost importance. It will now be evident, and become clearer upon more detailed discussion of practical examples hereinbelow, that this efficiency depends not only upon the individual radiation selectivity and sensitivity of the energy affected or effecting surfaces (such as photographic, photoelectric or electron responsive layers) but upon the above outlined beam effectivity in given spectral ranges, in conjunction with the light absorption characteristics also in given spectral ranges, of the light dividing or beam segregating elements. The beam effectivities should be utilized so far as possible, by arranging the system as a whole in such a manner that only a minimum amount of that energy is lost which can be utilized at the respective working surface. In this connection it must be kept in mind that the sensitivity and selectivity characteristics of conjointly used sensitive surfaces sometimes overlap, and this fact must be taken in consideration in selecting the most desirable light dividing element for the purpose at hand.

A further basically important consideration in devising systems of this type is that of selecting proper color balance of the separate spectral ranges involved, in correlating on psychophysiological principles the spectral values of the respective component images or records in order to provide a resultant image which creates a sensation experienced by the viewer to be a plausible and perhaps even pleasing simulation of natural or artistic effects.

Having in mind the above outlined problems and conditions, some of the principal objects of the present invention are to provide light linking, that is beam dividing or combining systems which waste a minimum of the energy incident on or emerging from the working surface or surfaces of the system while providing optimum color selectivity for the component color aspect images and proper color balance in the final fully colored image. Other objects are to provide such systems wherein the light from an object field is divided with maximum efficiency so that no light is wasted by being misdirected to a surface where its spectral range is not needed, and wherein each component beam carries only light of the spectral range particularly assigned thereto, these ranges being sharply distinct without undue overlap or omission of marginal ranges, to provide such systems which are independent from polarization phenomena caused by reflection occasionally occurring in the object field, to provide systems of this type which can be readily incorporated in existing apparatus without expensive modification of its mechanical and optical features, to provide such systems which are comparatively simple, inexpensive in manufacture, easy to test and to supervise during manufacture and use, and generally to advance the art of optical systems that relate several spectral ranges of an object field, ultimately to provide a resultant colored image of controllable quality.

In one of the main aspects of the invention, these objects are attained by combining a transparent body having a beam linking, dividing or combining, surface or surfaces carrying optical interference coatings which selectively reflect and transmit selected spectral ranges and are inclined to component beams which carry optical images of the selected spectral ranges of a given object field, with selective light transmitting means such as absorption filters and image affected or effecting working surfaces such as photographic emulsions or light emitting screens in the beams, wherein the color selectivities and sensitivities of the working surfaces and of the beam paths define respective beam effectivities, and the reflection-transmission rates of the interference coating are essentially predetermined for each spectral range to direct to or from respective working surfaces spectral ranges with essentially distinct transmission-reflection rates which are proportioned to effect with the respective beam effectivities essentially predetermined energy distribution at the working surfaces. This arrangement utilizes, for purposes of the invention, the possibility of making interference coatings which reflect as well as transmit in a range or ranges selected at will whereas they essentially only transmit in another range, and the possibility to predetermine fairly exactly the reflection-transmission rate in a selected range.

In more specific aspects, the working surfaces are color sensitive photographic emulsions confined in respective aperture devices, or photoelectrically responsive layers, or image presenting electron responsive coatings or photographic color aspect transparencies suited for additive projection, or indeed any material that defines an optical image by recording it, translating it into another form of energy, or inversely translating an image defining or manifesting configuration such as a modulated electron beam or a photographic record into terms of a colored image. The transparent body containing the beam dividing or combining linking surface or surfaces can be arranged to divide an image carrying beam into several differently colored component beams, or to combine several colored component beams into a resultant image carrying beam; in either case the spectral transmission-reflection characteristics of the dichroic interference coating are according to the invention correlated with the beam effectivities as above defined.

In a specific aspect concerning color photography by dividing an incident beam into component beams which carry in register the essentially blue, green and red spectral ranges of an incident beam, the invention is incorporated in the combination of a transparent body having a surface inclined to the beams; two film gates on either side of the surface; light transmitting means including portions of the body and light filter means in the paths of the beams; a red recording but little green sensitive emulsion layer and superposed thereon a blue recording but little green and red sensitive emulsion layer in one gate, and a green recording emulsion layer in the second gate, respective beam effectivities being defined by the color selectivity and sensitivity of said emulsion layers and the color selectivity of the paths, with the beam effectivity of the green recording gate being appreciably higher than that of the other gate; on the surface a dichroic optical interference coating which transmits and reflects light at transmission-reflection rates essentially predetermined for each spectral range, to direct into the green recording gate essentially only a portion of the green and to the other gate the other portion of the green and essentially all blue and red light incident on the surface, the above rate being proportioned essentially to effect, with the beam effectivities, essentially equivalent and balanced color distribution at the gates; and means including the said filter means for rendering ineffective the said other portion of the green light, whereby light incident on the surface is utilized with optimum efficiency, color selectivity and color balance.

In additional specific aspects concerning color photography, the invention is incorporated in transparent bodies with two interior intersecting surfaces carrying dichroic interference coatings whose transmission-reflection rates are correlated with the effectivities of three beams in the above indicated manner.

Other objects and aspects of novelty will appear—in addition to those contained in the above summary of the invention indicating its nature and substance including some of its objects—from the herein presented outline of its principles, mode of operation and practical possibilities together with a description of several typical embodiments illustrating its novel characteristics. These refer to drawings in which:

Figs. 1, 4 and 8 are schematical views of light dividing systems according to the invention;

Figs. 2, 5, 7 and 9 are diagrams illustrating the operation of systems according to Figs. 1, 4 and 8;

Figs. 3 and 6 are enlarged diagrammatical views of coatings such as shown in Figs. 1 and 4, respectively;

This application is a continuation-in-part of application Serial No. 66,528, filed December 21, 1948, and now abandoned.

Figure 1:
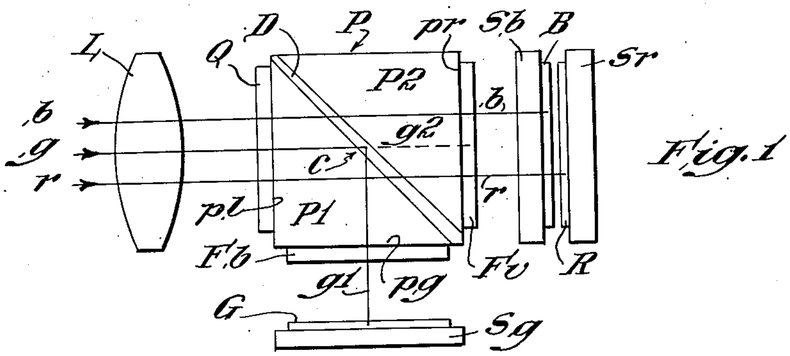
Figure 2:
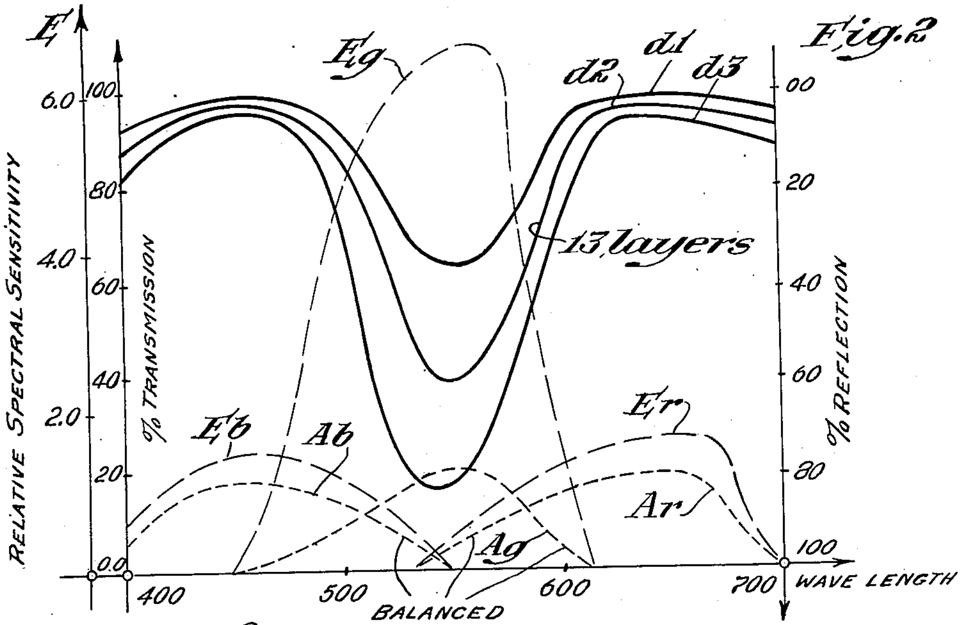
Figure 3:
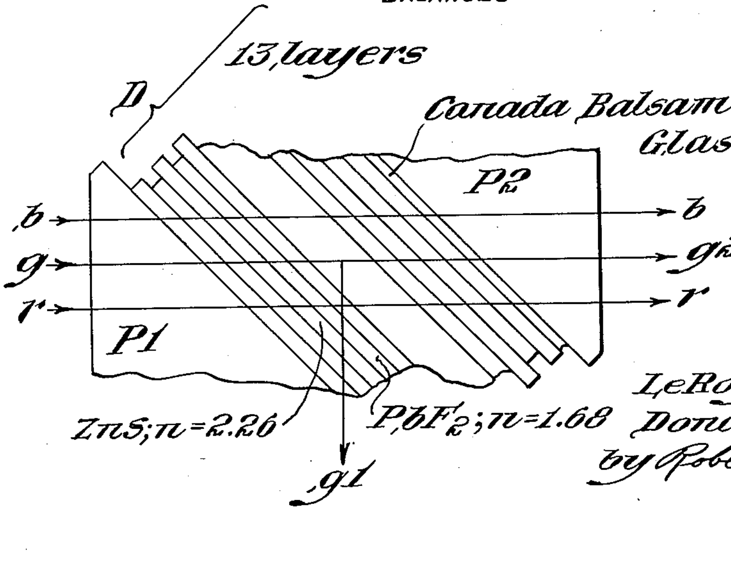

Referring to Figs. 1 to 3, an embodiment of the invention as applied to light dividing systems of the general type dealt with in U. S. Patent No. 2,000,058 to J. A. Ball, dated May 7, 1935, will first be described.

In this figure, L is an appropriate lens system, P1 and P2 are the halves of a diagonally divided cube shaped prism P, and B, G, R are photographic emulsions constituting working surfaces in the above-mentioned sense, supported on cellulose films S*b*, S*g*, and S*r* respectively. The prism carries a quarter wave plate Q, a blue absorbing or yellow filter F*b* and an ultra violet absorbing filter F*v* on outer, transmitting, surfaces *pl*, *pg* and *pr*, respectively, whereas the inner diagonally inclined surfaces of prism halves P1 and P2 carry an optical interference coating D of the type to be described more in detail below. The interference coating D, constructed as described below with reference to Fig. 3, transmits practically all blue rays *b* and red rays *r*, reflects green rays *g1*, and transmits green rays *g2*. Assuming a conventional nonselective divider, the photographic response of the bipack B, R is in many instances lower than that of either front or rear film alone for the reasons that on the one hand the speed of the rear film is reduced by the light absorption of the various components of the front film which cannot be made perfectly transparent and on the other hand the emulsion of the front film is made unusually thin in order to reduce light absorption therein.

The beam effectivities in a conventional system of the three emulsions B, G, R are indicated in curves E*b*, E*g* and E*r* of Fig. 2, wherein the above-defined beam effectivities for the individual emulsions are expressed in terms of relative spectral sensitivity plotted over the wave length. As explained above, these effectiveties include the effects of the bodies including filters in the paths of the light beams and of a dye or dyes in one or more of the emulsions, as well as the photographic color selectivities and speeds proper of the emulsions. The ranges in question are herein referred to as "blue," "green," "red," indicating the approximate color aspects recorded on the respective emulsions B, G, R, although the color selectivities may overlap somewhat in certain regions of the spectrum.

Although Fig. 1 indicates a preferred embodiment wherein the bipack consists of the red and blue recording emulsions wherein the blue recording emulsion is the front film of the bipack and the bipack is in the transmitted beam, variations of this scheme may be used, for example with the red and green recording emulsions forming the bipack, or the green record receiving the transmitted instead of the reflected light.

Recapitulating somewhat more in detail, with reference to this practical embodiment the above-mentioned concepts overall efficiency, color selectivity, and color balance, it will now be understood that the efficiency of the system as a whole is limited by the least sensitive aperture, in this case that with the blue-red bipack. The efficiency is thus determined by that fraction of the light which reaches the bipack emulsions, in the colors to which the bipack is sensitive. The selectivity is determined by the thin layer dichroically selective reflector D and the filters F*b*, F*v* and in conventional systems of this type it can only be influenced by means of sensitizing dyes applied to the emulsions during manufacture and by sharp cutting filters placed into the system, either in the form of filter sheets adjacent the prism, or of dye layers applied to the films themselves. Color balance is present if all three records respond equally to a given intensity of white light. If the beam effectivities for the three films are not equal, as indicated by curves E of Fig. 2, they must be made equal which however in conventional systems cannot be accomplished without interfering with either the efficiency or the selectivity, because the conventional beam splitters are for practical purposes nonselective as to spectral range although they can be adjusted for an average reflection-transmission ratio essentially equal for all spectral ranges. Thus a comparatively larger amount of light can be directed to the aperture of lower selectivity, in the present example the blue-red aperture. This expedient, although balancing the beam effectivities, is extremely inefficient since the undesirable light ranges have to be filtered from the apertures which do not record these ranges.

It has been proposed to use slightly selective reflectors, for example of metallic gold or dichroic dyes. However the selectivity of such reflectors is so ineffective and bound to a few spectral ranges that they are not capable of materially increasing the efficiency of systems of this type. These gold or dye reflectors are sometimes referred to as dichroic reflectors; their performance hardly justifies that term although they appear to be differently colored if viewed with reflected or transmitted light, respectively.

The loss of efficiency due to nonselectivity of the transparent reflector becomes more insignificant as the selectivity of one aperture decreases with regard to that of the other. Indeed, the most efficient method of utilizing a nonselectively reflecting surface is to divide the light without respect to color so as to favor the low selectivity aperture. This efficiency is however far from ideal since the maximum possible performance of the aperture of lowest selectivity, in the present example that with the bipack, is not utilized. In this embodiment only 80 percent of the incoming blue and red light would for example reach the bipack so that an increase in speed of 25 percent above this level might be obtained if the bipack received all of the light to which it is sensitive. Obviously this cannot be accomplished with conventional reflectors which send a large amount of green light to the bipack aperture while similarly wasting much red and blue light at the green aperture. If the speed of the green record could be increased then the beam splitter could be rebalanced and the speed of the whole process would be increased very slightly. On the other hand if the speed of the bipack were increased the process speed would likewise be increased but the efficiency or useful fraction of this speed would actually decrease. Thus the nonselective reflector is not only inefficient when used with film of the present type, but it also limits the usefulness of any foreseeable improvements in photographic emulsions. The same is true of the above-mentioned metal reflectors whose selectivity is rigid and nonadjustable in the sense that they transmit as well as reflect light of two given spectral ranges, with different transmission reflection ratios fixedly different for the two ranges. For example, gold transmits as well as reflects the red and green ranges, although more green is transmitted and more red light reflected.

In accordance with the present invention, optimum efficiency is obtained by appropriately utilizing certain possibilities offered by now available dichroic reflectors consisting of superimposed thin layers of dielectric material having alternately high and low indices of refraction. The absorption of these thin layer reflectors is very low so that practically all the light of any color which is not reflected to one aperture can be transmitted to the other. The spectral selectivity of these reflectors is determined by the thickness of the individual layers relative to the wave length of the spectral range to be reflected, whereas the efficiency is a function of the total number of layers applied. By depositing the material in question by means of evaporation or sublimation, a number of such dielectric layers, highly selective reflectors of this type can be made which exhibit different very bright colors by reflection and transmission respectively, so that the term dichroic can be applied to these surfaces with more propriety than to the previously mentioned metal or dye reflectors. In systems of the type herein dealt with these thin layer dichroic surfaces would be considerably more efficient than the heretofore used more or less neutral reflectors, if the beam effectivities were fairly well balanced. This however is not the fact and most likely will not be accomplished in the foreseeable future, so that replacement of the old by these new reflectors does not offer a very considerable advance towards the problem of optimum efficiency light division while maintaining proper color selectivity and color balance. For example in the practical case above discussed the bipack of a system with unbalanced selectivity according to the E curves of Fig. 2, the bipack can already receive 80 per cent of the light from a neutral reflector, and since this is the factor which limits the efficiency of the process, substitution of an interference reflector designed on conventional principles does not result in any increase in speed whatsoever.

In this connection it must also be kept in mind that the cuts of thin layer reflectors are determined by the optical interference phenomena inherent in the layers in question so that, once band width and peak reflection have been established the cut shape of these characteristics are rather fixed, in a manner which is not necessarily ideal for photographic color separation. Thus the mere exchange so far as color selection is concerned, of conventional color filters and interference reflectors rather limits the efficiency of the system as a whole, since it does not permit independent control of the curve shapes for the three records. Mainly for these reasons multiple dielectric film surfaces have heretofore not been applied to photographic apparatus employing divided light beams of different spectral ranges and different beam effectivities.

In accordance with the invention, the three requirements for an ideal beam linking device whether splitter or combiner, namely satisfactory light transmitting efficiency, color selectivity and color balance are provided as follows, always having in mind however that the performance of even the best beam splitting or combining device cannot be ideal but merely of optimum quality so long as the beam effectivity curves are not balanced and overlap; perfect efficiency and ideal selectivity are with practically available materials mutually exclusive requirements even in theory.

We obtain optimum efficiency, selectivity and balance by using, instead of the easily available fully dichroic selectivity of the new interference reflectors, merely a partial selectivity according to principles which will now be explained more in detail. The color selective characteristics of reflectors according to our invention are indicated by curves *d1*, *d2*, *d3* of Fig. 2. Curve *d1* for example indicates that, although the corresponding surface D reflects only about one fourth of the green light to the green aperture, it transmits about three fourths of the green and nearly all of the red and blue light to the bipack, and hence utilizes nearly all of the limited bipack speed. It should be noted that the primary purpose of reflectors of this type is not merely color selectivity, but color balance and efficiency of the system as a whole; they are much more efficient than highly selective interference coatings acting primarily as filters with practically total reflection in one spectral range and partially total transmission in another range. For example the coating of the above described embodiment of our invention definitely does not completely assume the function of the color separation filters. It still sends an unusable portion of the green light, about two thirds thereof, to the bipack aperture where it is rendered ineffective by conventional filters in cooperation with the color selectivity characteristics of the bipack emulsions. Nevertheless, this system has nearly 25 percent more efficiency as compared to systems with nonselective or practically totally selective reflectors, considered in terms of beam effectivity with photographic films actually available for making color pictures. In this sense, interference coatings of the type herein proposed might correctly be termed semi-dichroic or semi-selective light dividers.

The semi-selective beam splitter of the embodiment according to Figs. 1 to 3 does not affect the shapes of all three film sensitivity curves but only that of the green curve by narrowing the sensitivity band of the green record rather than lowering it uniformly. Although the reflector leaves the sensitivity curves of the red and blue films practically unchanged it nevertheless transmits to them all the useful red and blue light. In this respect it is most efficient when the green sensitivity is somewhat greater than that of the bipack.

It will be evident that the exact shape of the characteristic transmission-reflection curve of the semi-dichroic surface will in each practical case depend upon the prevailing beam effectivities. The characteristic of the semi-dichroic reflector can be changed accordingly, as indicated by curves *d1*, *d2*, *d3* of Fig. 2 which have respective transmission-reflection ratios of about 1/5, 1/3 and 1/1.5 In any case, interference coatings of this type reflect or transmit a major portion of the light in a given spectral band, while they transmit or reflect, respectively, appreciable portions of the light in that same band.

The resultant overall beam effectivities are indicated in Fig. 2 at A*b*, A*g* and A*r*, for reflector characteristic *d1* and emulsion sensitivities E for a nonselective reflector; it will be noted that these A effectivities are practically perfectly balanced.

Methods of producing dielectric reflectors of the above described type are now well-known to those skilled in the art. A certain number of layers of nonconducting substances having negligible light absorption are deposited in solid state on a surface of glass or other transparent optical material by means of thermal evaporation in a vacuum chamber. It is important that the refractive indices of neighboring layers differ by a significant amount and ordinarily only two materials are used, by depositing alternate layers of high and low indices to as great a number as is needed. The thickness of each layer is a certain fraction of the wave length at which a peak in the reflection transmission curve is desired.

Fig. 3 indicates in greatly exaggerated action the construction of a semi-dichroic reflector according to Fig. 1, computed and constructed to produce curve *d2* (ratio 1/3) of Fig. 2, that is a characteristic according to which almost 100 percent of the blue and red spectral ranges and about 40 percent of the green range are transmitted to the bipack aperture, whereas 60 percent of the green light is reflected to the green recording aperture, which receives practically no blue or red light. Thirteen layers are applied, and each layer has an optical thickness (expressed by the formula $nt \cos \theta$ wherein $t$ is the actual thickness, $n$ the refractive index, and $\theta$ the inclination of the surface to a selected ray) which is in the direction parallel to the light beam equal to one quarter or an odd multiple thereof, of the wave length of the peak spectral range to be reflected, in the present instance approximately 5,300 Angstroms for green. The materials used in this embodiment are zinc sulfide ($n=2.36$) and lead fluoride ($n=1.68$). Suitable high and low index materials may be substituted, but it should be kept in mind that both dielectric media of interference layers of this type, enclosed within refractive bodies, should have indexes which are not appreciably lower than the index of the body. The actual thicknesses at the point C may be found from the relation:

$$t=\frac{5300}{\cos \theta\, 4n}$$

where $\theta$ is the angle of refraction of the ray through the dielectric material in question. Since $\theta$ varies with the index of refraction of the glass prism according to Snell's law, fixed values of $t$ cannot be given. In the case of a glass prism, for example with an index of refraction $n=1.57$, the mechanical thickness $t$ of zinc sulfide layers would compute to about 0.33 micron, from the above formula.

The dielectric layers are coated on the surface of one of the prisms P1 or P2, according to well-known methods, whereupon the component prisms are cemented to form the cube P.

In accordance with the now well known theory of thin multilayer films, the peak reflection values can be increased by increasing the number of alternating layers of high and low indices or by increasing the index differences between the layers. The spacing between successive reflection bands and the widths of the bands themselves can be decreased by increasing the individual layer thickness in odd multiples of ¼ of the wave length of the peak reflection desired. Increasing the number of layers also has the effect of narrowing the band width but without changing the spacing between reflected bands. The shapes of the reflectance curve can be changed somewhat by using different quarter wave multiples for successive layers. Thus although the construction described above applies only for curve *d2* of Fig. 3, entire families of such composite layers corresponding to families of curves can be readily derived by applying the above mentioned well known principles.

As mentioned above the specific thickness dimensions are correct only for an axial point C of Fig. 1. If the effect of the beam splitter is to be uniform across the entire field, the optical thickness of each layer of the coating should be the same for selected rays through the field of the lens. In accordance with the invention, a predetermined hue distribution over the field is obtained by applying the coating in the form of a wedge, as indicated in Fig. 1, with the thinner ends of the wedge nearest to the lens system. This arrangement provides equal path differences for differently inclined rays according to elementary geometrical principles. Fixed numerical data for the wedge configuration cannot be given since they depend entirely upon conventional optical data of the system as a whole, such as focal length of the lens, distance and size of the exit pupil from the beam splitter, and the dimensions and index of the glass of the cube.

The wedge gradient can be determined empirically by relating optical measurements of actual coatings to the position in which the surfaces to be coated are placed in the evaporating apparatus. The wave length distribution over the field can be purposely distorted from theoretical uniformity for a selected ray system, in order to obtain photographic uniformity as controlled by the cut-off wave lengths of the respective beams.

Semi-dichroic films of the type herein described reflect nonpolarized and plane polarized light differently. Since some polarized light may occur in motion picture and television object fields, mainly due to the presence of specular objects, this differential response would tend to impart false colors to spectral objects due to more complete reflection of vertically polarized light. The above-mentioned insertion of a quarter wave plate Q (Fig. 1) converts according to the invention the undesirable plane polarized light component into circularly polarized light for one selected wave length and into elliptical polarized light for the other wave lengths. Tests have indicated that this will provide sufficient correction for beam splitters of the type above described. If particularly exact compensation is desired, so-called achromatic quarter wave plates may be employed, which convert plane polarized light within a sufficiently wide wave length range into circularly polarized light.

It will be evident that the above specifically described recording ranges are not the only ones to which the invention can be applied and that indeed all combinations with single or superimposed emulsions in respective apertures or beams are feasible although not all of them are practical for specific purposes.

As already indicated, the principles underlying the embodiments described above with reference to Figs. 1 to 3 can be applied to systems with three separate beams and apertures. Such arrangements require two transparent reflector layers and, besides being useful for photographic apparatus with three different film supports, they are analogously available in the television art wherein the recording emulsion or otherwise photographically effective surface is replaced by photoelectrically or electronically responsive surfaces. As likewise mentioned above the efficiency problem arises in connection with three aperture systems because even if separated and placed in independent apertures the three image means are not likely to be matched for the purpose at hand even if proper spectral differentiation can be established. Referring by way of example particularly to photographic systems, the emulsion thickness, speed and graininess are interrelated so that, as mentioned above, the increase of emulsion sensitivity which can be obtained without introducing excessive graininess or other undesirable properties is limited. As likewise mentioned above this limitation is in photographic systems mainly due to granularity conditions, lower contrast sensitivity of the eye to yellow, and emulsion speed restrictions imposed by the properties of sensitizing dyes; in a three aperture camera the blue record negative is at the present time likely to be the most sensitive with the red next and the green emulsion having the lowest speed of all three apertures, although other selectivity distributions are encountered, some of which will be indicated by way of example. In television apparatus conditions are analogous, due to varying sensitivity (manifested as impedance variations) of photoelectrically responsive surfaces to different wave lengths, and the emission qualities of phosphors or analogous structures of receiving tubes, whether designed for emitting white or colored light. In none of these arrangements exists utilization of the maximum possible image defining selectivity of all three working surfaces.

Shortly recapitulating the previously outlined phenomena, the reasons for this are that either the light is divided inefficiently with respect to wave length at the beam splitter, or else the three emulsions or other optically effective surfaces are balanced by wasting light of one or more of the beams elsewhere in the optical system, as for example by filter absorption. In either case the least effective image defining material is not reached by the maximum possible amount of light, which is the condition for maximum overall efficiency.

Optimum conditions can be established in systems of the last mentioned three aperture type in accordance with the present inventions, as follows.

Referring to a typical example from the art of color photography, it can be assumed that the relative speeds of the three films, after their proper spectral sensitivities and emulsion speed versus graininess relationships have been established as outlined above, are 200 for the blue sensitive film, 100 for the green sensitive film, and 150 for the red sensitive film. The green film being the slowest, it is required that it receive as nearly as possible 100 percent of the available light of the properly selected green range. Since it is easier to make a highly transmitting dichroic surface than a highly reflecting one it will be generally speaking preferable to locate the green recording emulsion in the transmitted beam and the blue and red recording emulsions in reflected beams.

Such an arrangement will now be described with reference to Figs. 4, 5 and 6.

Fig. 4 shows a prism P*d* of the general construction of Fig. 1 but with two transmitting reflectors intersecting at right angles, these coatings being indicated at D*b* and D*r*. Light is supplied to the prism by lens system L and the prism itself consists of four triangular components P5, P6, P7 and P8. The three color aspect ranges are again indicated by rays *b*, *g* and *r*.

In keeping with the principles of the present invention as outlined before with reference to Figs. 1 to 3, the reflectors D*b*, D*r* which split off the blue and red beams are not completely reflecting even in their respective colors but reflect only enough light to produce actinic effects in the blue and red emulsions equal to that in the green emulsion. By limiting the peak reflection of these surfaces to the minimum necessary for balance, their transmission with respect to the green beam is kept very close to 100 percent.

The specific embodiment according to Fig. 4 is based on the above outlined assumption that the blue aperture speed is twice that of the green aperture which latter receives practically all of the green light so that the blue reflector D*b* need only send an average of 50 percent of the blue light to the aperture holding emulsion B. The spectral distribution of the light of the beams reaching each of the three apertures is shown in Fig. 5. The blue aperture curve *db* represents the transmission-reflection characteristic of surface D*b* which reflects the blue and transmits the green and red ranges, combined with the transmission characteristic of surface D*r*, which is in series with D*b*. The red aperture curve *dr* represents the reflection characteristic of surface D*r* which reflects the red and transmits the blue and green ranges, combined with the transmission characteristic of surface D*b*. The green aperture curve *dg* is derived from *db* and *dr* according to the formula $dg=(1-Dr)(1-Db)$. The integrated effects of the three curves provide with the appropriate film emulsion sensitivity curves three primary records of approximately equal speeds with no usable light lost.

As indicated in Fig. 6, five or six high index layers of zinc sulphide separated by four or five low index layers of lead fluoride, together nine or eleven layers, are sufficient for the blue reflecting layer D*b*, since they will produce a peak reflection in the blue region of about 60 percent when cemented. The red reflector D*r* requires more layers since the red record is somewhat slower although still using considerably less than 100 percent of the red light. Ten or eleven sulphide layers separated by nine or ten lead fluoride layers, together nineteen or twenty-one layers, were found to produce a peak reflection of 85 percent when cemented, or an average reflection of about 70 percent with respect to the red sensitivity. These elements produce the required balance of the three emulsion speeds.

In comparing the beam effectivity data given with reference to the system according to Fig. 1 and the one according to Fig. 4 it should be kept in mind that in the first case, which refers to a two aperture system with a single semi-dichroic reflector layer, the combined blue-red aperture has a lower speed than the green aperture, whereas in the latter example with three separate apertures and two semi-dichroic dividers, the green recording aperture has the lowest speed since the blue and red recording surfaces, each of which is individually faster, are separated while in the first example where they are combined their resultant speed is lower than that of the green emulsion. As indicated, corrective absorption filters F*b*, F*g*, F*r* can be inserted in the light paths of the three apertures, if further adjustment of the effectivities should be desirable.

The optical thickness of each of the layers of the blue reflector D*b* is an odd integer multiple of a quarter wave length of blue light for example three quarters of 4250 Angstrom, and the optical thickness of each of the layers of the red reflector D*r* is a similar multiple of a quarter wave length of red light, for example three quarters of 6250 Angstrom. The actual thicknesses are again found in accordance with the above formula for *t*. Some variation in these dimensions may be permitted for individual layers in order to make slight adjustments in the band width of either reflector.

Each reflector is coated on one set of prism faces at right angles to the other, so that practically the entire beam reflected by one must be transmitted by the other reflector. The transmission-reflection characteristics have a cut sufficiently sharp so that the overall efficiency suffers very little from the requirement of transmitting the beam reflected by the other dividing surface.

For the actual coating, two prism components which are to be assembled directly opposite to each other (such as P5 and P7) are each coated on two faces, first with one type of coating (for example D*r*) while the two faces which are to receive D*b* are in contact, and then with the other coating (D*b*) while the faces with the first coating (D*r*) are in contact. The four prisms are then cemented together with the two like coatings in alignment and with the flat apexes of the two coated prisms substantially contacting at the crossing.

For reasons pointed out above, the reflector coatings should be applied in the form of wedges, and a quarter wave retardation plate Q should be incorporated, as fully described above.

As pointed out above, the embodiment according to Figs. 4 to 6 is particularly suited for work with a red emulsion that is somewhat slower than the green emulsion. It is now possible to obtain high speed red sensitive emulsions and, in accordance with the invention, the arrangement described with reference to Figs. 4 to 6 can be modified to achieve optimum energy utilization with such highly sensitive red recording films.

While the general arrangement of a device for that purpose is similar to that shown in Fig. 4, the relative effectivities of the three beams and hence the transmission-reflection characteristics of the two crossed interference coatings are different from those of Fig. 5. They are shown in Fig. 7.

Fig. 7 indicates at *db*1 the transmission-reflection characteristic of the dichroic coating reflecting the blue and transmitting the green and red ranges, combined with the transmission characteristic of the other, red reflecting coating through which the light must likewise pass. The red aperture curve *dr*1 indicates that, in accordance with the above mentioned peculiarity of this embodiment, the red reflecting coating transmits here to an appreciable degree in addition to reflecting in the red range. The resulting green aperture curve *dg*1 indicates that red light is transmitted to the green recording aperture in addition to the green range. This red light is eliminated by an appropriate filter F*g* as above discussed. The coatings proper are constructed similar to those shown in Fig. 6, with the difference that in this instance the red reflecting coating, corresponding to D*r* in Fig. 6, has here a purposely reduced number of layers such as a total of nine or eleven deepnding on the characteristic of the red recording emulsion, whereas the blue reflecting coating has the number of coatings requisite for optimum color selectivity, such as a total of twenty one layers as indicated in Fig. 6 for the red reflecting coating D*r*.

Figure 8:
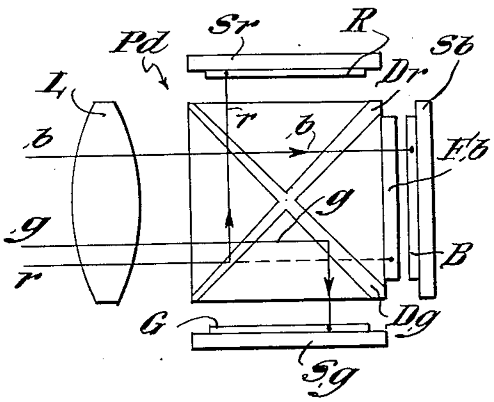
Figure 9:
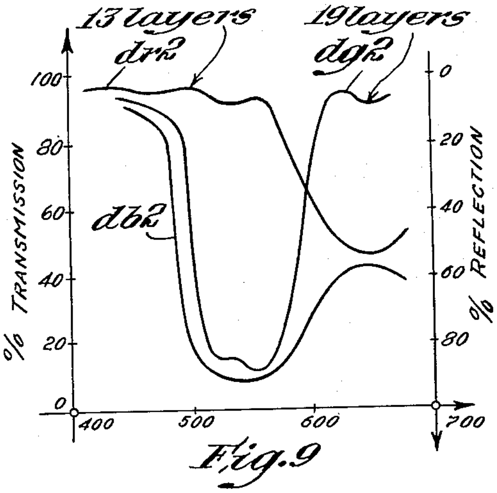

The principle of establishing optimum beam effectivity by purposely introducing a predetermined amount of otherwise unnecessary and avoidable appreciable transmission of a selected range, is further illustrated by the following example referring to Figs. 8 and 9. This system is preferable if the red sensitive emulsion requires the least amount of energy, whereas the blue and green recording emulsions are less sensitive. As indicated in Figs. 8 and 9, the coating D*g* fully reflects the green and transmits the blue and red light whereas coating D*r* transmits blue and green, but reflects as well as transmits red light. A filter F*b* eliminates this undesirable transmitted red light. The coating D*g* again has the number of layers, approximately nineteen to twenty, required to assure essentially full reflection of the green range, whereas the red reflecting coating D*r* has a reduced number of layers, for example eleven to thirteen, in order to provide the required reduced reflection of red light.

Figure 10:
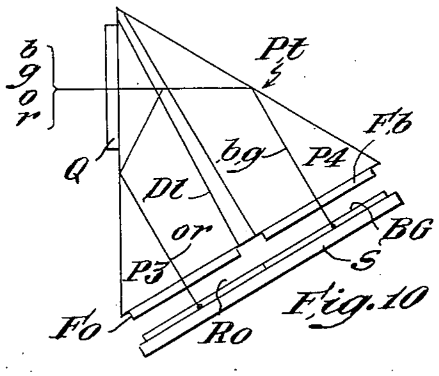
Fig. 10 is a schematical view, similar to Fig. 1, of a light dividing system of different type, likewise incorporating the invention.

Instead of using a cube shaped prism as shown in Fig. 1, triangular light dividers as indicated in Fig. 10 may be used. This figure shows a light splitter of this type originally intended for purposes of two color photography, whereby color aspect records of two spectral ranges are recorded on alternate frames of a single film strip as for example described in Patent No. 1,457,500.

In the embodiment according to Fig. 10, the prism P*t* consists of two triangular components P3 and P4 which are separated by a semi-dichroic reflector surface D*t* of the above described type. Prism P3 may carry a quarter wave plate Q, and the recording apertures may be provided with absorption filters F*b* and F*o*, which are only used if for some particular reason the cut of reflector D*t* does not provide the exact selectivity range for recording in the respective apertures. The support S carries an emulsion BR upon which records on alternate frames BG and RO the blue-green and red-orange aspects respectively. The reflection transmission ranges, analogous to those explained with reference to Figs. 2, 5, 7 and 9 are so selected that the beam effectivities are practically equal and proper color balance is obtained at optimum overall efficiency.

Figure 11:
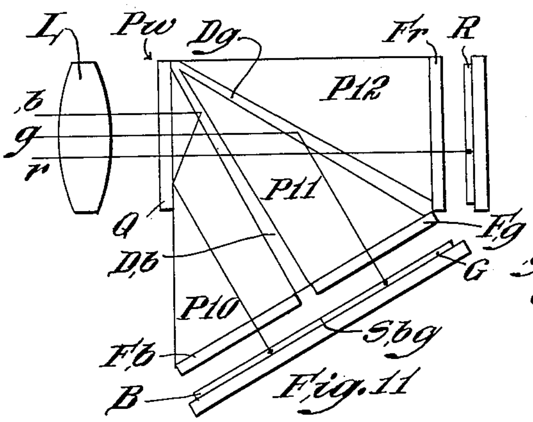
Fig. 11 is a schematical view similar to Fig. 10, but with two reflecting surfaces.

Instead of intersecting reflectors of the type described above with reference to Figs. 4 and 8, reflectors which intersect outside the field of vision can be used for three aperture apparatus. An example of such an arrangement is shown in Fig. 11 which incorporates a prism system of the type described in Patent No. 2,189,932. The system according to Fig. 11 has a prism P*w* with three triangular prism components P10, P11 and P12, separated by two dichroic layers namely D*g* reflecting green and transmitting red light, and D*b* reflecting blue and transmitting green and red light. It will be noted that layer D*g* can be designed regardless of the blue range, since it is not reached by blue light which is reflected at D*b*. Again filters F*b*, F*g* and F*r* may be applied for the purpose of better correlation of the reflector and emulsion cuts, and for the above explained reasons the quarter wave plate Q is applied if the system serves purposes involving the possible reception of plane polarized light. Emulsion B and G might be applied to a so-called wide film in a double aperture whereas emulsion R may be guided in a second, standard, gate.

As mentioned above, the invention may be applied to systems other than for photographic taking purposes, for example for sending television images. For the purpose of illustrating such possibilities, Fig. 12 shows television sending apparatus incorporating a beam splitting system of a third type, with rectangularly intersecting reflectors.

Figure 12:
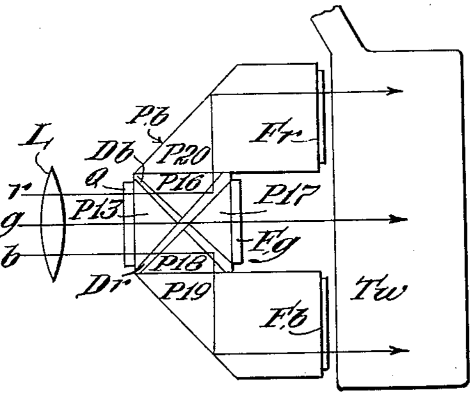
Fig. 12 is a schematical view of a television sending arrangement incorporating the invention.

Fig. 12 shows a prism P*b* which is composed of six blocks P15, P16, P17, P18, P19 and P20. A semi-dichroic wedge reflector D*r* reflects red light and transmits blue and green light, and another similar reflector D*g* reflects blue light and transmits green and red light. A camera tube T*w* is juxtaposed to the discharging surfaces of the prism which may be equipped with appropriate filters F*b*, F*g* and F*r*. The lens system L images the incoming image carrying white light on the signal receiving surface of the tube after it has been split into three component beams of the appropriate spectral ranges, in a manner which will now be evident without further detailed explanation. It will be noted that dividers according to the invention are particularly well suited for single tube color television systems as exemplified in Fig. 12, because such tubes do not readily permit electric control of color balance.

It will be understood that similar systems can be employed for purposes of television viewing apparatus as well as color photography generally involving for example additively projecting film records onto viewing screens, backgrounds, or screens for television sending apparatus, with camera tubes similar to that of Fig. 9, or with separate photosensitive equipment for example three phototubes in a flying spot scanning sender.

While the invention is particularly adapted for dividing light beams, it may be applied to additive combination of image carrying beams, particularly in instances where an added black and white image of the nature of a neutral key is not detrimental, such image resulting from reduced color saturation incident to increased screen brightness obtained according to the invention. If systems of this type are used for the additive resolution of component images, the above referred to concept of beam effectivity is analogously applied to the light emitting instead of light absorbing surfaces of the system.

It should be understood that the present disclosure is for the purpose of illustration only and that this invention includes all modifications and equivalents which fall within the scope of the appended claims.

We claim:

1. In camera apparatus for color separation photography by dividing an incident beam into component beams which carry in register images of the essentially blue, green and red spectral bands originating in the incident beam, in combination: a transparent body having a light dividing surface adapted to be inclined to said incident beam and to divide the incident beam into two component beams inclined with respect to each other; two film gates, one on either side of said surface; a red recording but little green sensitive emulsion layer and superposed thereon a blue recording but little green and red sensitive emulsion layer in one gate, and a green recording emulsion layer in the second gate, the color selectivity and sensitivity of said green recording emulsion layer being appreciably higher than that of the other emulsion layers; on said surface an optically selective light transmitting and reflecting interference coating having alternate layers of media of respectively high and low refractive indexes and of respective thicknesses for selectively transmitting light in the blue and red spectral bands and for reflecting light in the green spectral band, the said refractive indexes and thicknesses of said layers being such as to reflect a major portion of said green light but to transmit an appreciable portion of said green light and to transmit substantially all of the light in the blue and red spectral bands, said selective coating being adapted selectively to transmit and reflect the incident beam to produce substantially the same effective light energy in said reflected green band as in each of the transmitted blue and red bands at a transmission-reflection ratio to effect balanced color distribution at said gates; and filter means in the path of said transmitted blue and red bands for absorbing said transmitted portion of the green light, whereby light incident on said surface is utilized with optimum efficiency and color selectivity, and whereby the light reaching said respective emulsion layers is of the proper intensity and color so as to produce the desired color balance.

2. In camera apparatus for color separation photography by dividing an incident beam into component beams which carry in register images of the essentially blue, green and red spectral bands originating in the incident beam, in combination: a transparent body having two intersecting light dividing surfaces adapted to be inclined to said incident beam and to divide the incident beam into three component beams inclined with respect to each other; three film gates, one gate of any one pair of gates on either side of one of said surfaces; a red sensitive but little green sensitive emulsion layer in one gate, a blue sensitive but little green and red sensitive emulsion layer in a second gate, and a green sensitive emulsion layer in a third gate, the color selectivity and sensitivity of said green sensitive emulsion layer being appreciably lower than that of the other emulsion layers; on one of said intersecting surfaces a first optically selective light transmitting and reflecting interference coating having alternate layers of media of respectively high and low refractive indexes and of respective thicknesses for selectively transmitting light in the green and red spectral bands and for reflecting light in the blue spectral band, the said refractive indexes and thicknesses of said layers of said first coating being such as to reflect a major portion of said blue light but to transmit an appreciable portion of said blue light, and to transmit substantially all of the light in the green and red spectral bands; and on the other one of said intersecting surfaces a second optically selective light transmitting and reflecting interference coating having alternate layers of media of respectively high and low refractive indexes and of respective thicknesses for selectively transmitting light in the blue and green spectral bands and for reflecting light in the red spectral band, the said refractive indexes and thicknesses of said layers of said second coating being such as to reflect substantially all of the red light and to transmit substantially all of the blue and green light; said selective coatings together being adapted selectively to transmit and reflect the incident beam to produce substantially the same effective light energy in said reflected blue band as in each of the green and red bands at a transmission-reflection ratio to effect balanced color distribution on said emulsion layers; and filter means in the path of said transmitted green band for absorbing said transmitted portion of the blue light, whereby light incident on said surfaces is utilized with optimum efficiency and color selectivity, and whereby the light reaching said respective emulsion layers is of the proper intensity and color so as to produce the desired color balance.

3. In camera apparatus for color separation photography by dividing an incident beam into component beams which carry in register images of the essentially blue, green and red spectral bands originating in the incident beam, in combination: a transparent body having two intersecting light dividing surfaces adapted to be inclined to said incident beam and to divide the incident beam into three component beams inclined with respect to each other; three film gates, one gate of any one pair of gates on either side of one of said surfaces; a red sensitive but little green sensitive emulsion layer in one gate, a blue sensitive but little green and red sensitive emulsion layer in a second gate, and a green sensitive emulsion layer in a third gate, the color selectivity and sensitivity of said red sensitive emulsion layer being appreciably higher than that of the other emulsion layers; on one of said intersecting surfaces a first optically selective light transmitting and reflecting interference coating having alternate layers of media of respectively high and low refractive indexes and of respective thicknesses for selectively transmitting light in the blue and green spectral band and for reflecting light in the red spectral band, the said refractive indexes and thicknesses of said layers of said first coating being such as to reflect a major portion of said red light but to transmit an appreciable portion of said red light, and to transmit substantially all of the light in the blue and green spectral bands; and on the other one of said intersecting surfaces a second optically selective light transmitting and reflecting interference coating having alternate layers of media of respectively high and low refractive indexes and of respective thicknesses for selectively transmitting light in the green and red spectral bands and for reflecting light in the blue spectral band, the said refractive indexes and thicknesses of said layers of said second coating being such as to reflect substantially all of the blue light and to transmit substantially all of the green and red light; said selective coatings together being adapted selectively to transmit and reflect the incident beam to produce substantially the same effective light energy in said reflected red band as in each of the blue and green bands at a transmission-reflection ratio to effect balanced color distribution on said emulsion layers; and filter means in the path of said transmitted green band for absorbing said transmitted portion of the red light, whereby light incident on said surfaces is utilized with optimum efficiency and color selectivity, and whereby the light reaching said respective emulsion layers is of the proper intensity and color so as to produce the desired color balance.

4. In camera apparatus for color separation photography by dividing an incident beam into component beams which carry in register images of the essentially blue, green and red spectral bands originating in the incident beam, in combination: a transparent body having two intersecting light dividing surfaces adapted to be inclined to said incident beam and to divide the incident beam into three component beams inclined with respect to each other; three film gates, one gate of any one pair of gates on either side of one of said surfaces; a red sensitive but little green sensitive emulsion layer in one gate, a blue sensitive but little green and red sensitive emulsion layer in a second gate, and a green sensitive emulsion layer in a third gate, the color selectivity and sensitivity of said red sensitive emulsion layer being appreciably higher than that of the other emulsion layers; on one of said intersecting surfaces a first optically selective light transmitting and reflecting interference coating having alternate layers of media of respectively high and low refractive indexes and of respective thicknesses for selectively transmitting light in the blue and green spectral bands and for reflecting light in the red spectral band, the said refractive indexes and thicknesses of said layers of said first coating being such as to reflect a major portion of said red light and to transmit an appreciable portion of said red light, and to transmit substantially all of the light in the blue and green spectral bands; and on the other one of said intersecting surfaces a second optically selective light transmitting and reflecting interference coating having alternate layers of media of respectively high and low refractive indexes and of respective thicknesses for selectively reflecting light in the green spectral band and for transmitting light in the blue and red spectral bands, the said refractive indexes and thicknesses of said layers of said second coating being such as to reflect substantially all of the green light and to transmit substantially all of the blue and red light; said selective coatings together being adapted selectively to transmit and reflect the incident beam to produce substantially the same effective light energy in said reflected red band as in each of the blue and green bands at a transmission-reflection ratio to effect balanced color distribution on said emulsion layers; and filter means in the path of said transmitted blue band for absorbing said transmitted portion of the red light, whereby light incident on said surfaces is utilized with optimum efficiency and color selectivity, and whereby the light reaching said respective emulsion layers is of the proper intensity and color so as to produce the desired color balance.

References Cited in the file of this patent

UNITED STATES PATENTS

| | | |
|---|---|---|
| 1,238,775 | Ives | Sept. 4, 1917 |
| 1,497,356 | Comstock | June 10, 1924 |
| 1,497,357 | Comstock | June 10, 1924 |
| 1,607,661 | Albert | Nov. 23, 1926 |
| 2,000,058 | Ball | May 7, 1935 |
| 2,096,425 | Dixon | Oct. 19, 1937 |
| 2,399,860 | Dimmick | May 7, 1946 |
| 2,418,627 | Dimmick | Apr. 8, 1947 |
| 2,589,930 | Dimmick | Mar. 18, 1952 |
| 2,604,813 | Gretener | July 29, 1952 |
| 2,621,245 | Kell | Dec. 9, 1952 |
| 2,642,487 | Schroeder | June 16, 1953 |

FOREIGN PATENTS

| | | |
|---|---|---|
| 586,957 | Great Britain | Apr. 9, 1947 |